United States Patent
Jones et al.

(10) Patent No.: US 12,460,377 B2
(45) Date of Patent: Nov. 4, 2025

(54) ADJUSTABLE TRACKS

(71) Applicant: The Charles Machine Works, Inc., Perry, OK (US)

(72) Inventors: Roger T. Jones, Stillwater, OK (US); Lelan Mack Powers, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 479 days.

(21) Appl. No.: 18/159,005

(22) Filed: Jan. 24, 2023

(65) Prior Publication Data

US 2023/0235530 A1 Jul. 27, 2023

Related U.S. Application Data

(60) Provisional application No. 63/302,830, filed on Jan. 25, 2022.

(51) Int. Cl.
*E02F 9/02* (2006.01)
*B62D 55/06* (2006.01)
*B62D 55/084* (2006.01)

(52) U.S. Cl.
CPC .............. *E02F 9/024* (2013.01); *B62D 55/06* (2013.01); *B62D 55/084* (2013.01)

(58) Field of Classification Search
CPC ........ E02F 9/024; B62D 55/06; B62D 55/084
See application file for complete search history.

(56) References Cited

U.S. PATENT DOCUMENTS

| | | | |
|---|---|---|---|
| 8,240,783 B2 | 8/2012 | Johnson et al. | |
| 8,430,188 B2 | 4/2013 | Hansen | |
| 8,662,216 B2* | 3/2014 | Roucka | E02F 9/024 |
| | | | 180/9.46 |
| 9,586,635 B2 | 3/2017 | Sewell | |
| 9,970,176 B2 | 5/2018 | Azure et al. | |
| 11,097,583 B2* | 8/2021 | Rohde | B60G 5/00 |
| 11,845,502 B2* | 12/2023 | Hilman | B62D 55/065 |
| 2007/0017713 A1 | 1/2007 | Sewell et al. | |
| 2022/0119052 A1 | 4/2022 | Kukuk et al. | |
| 2024/0308604 A1* | 9/2024 | Pfanzelt | B62D 55/084 |

FOREIGN PATENT DOCUMENTS

| | | | | |
|---|---|---|---|---|
| EP | 1442968 A1 * | 8/2004 | ........... | B62D 55/084 |
| KR | 20230143482 A * | 10/2023 | .............. | E02F 9/024 |

* cited by examiner

*Primary Examiner* — Faye M Fleming
(74) *Attorney, Agent, or Firm* — Tomlinson McKinstry, P.C.

(57) ABSTRACT

A vehicle having two configurations. The vehicle has two track frames, one on each side of a vehicle frame. The position of the track frames is adjustable relative to the vehicle frame by removing a connector, such as a first bolt, from a hole in the vehicle frame and a plate extending from the track frame. Another bolt is disposed in the vehicle frame and a slot in the plate. The track frame may be moved inwardly or outwardly to change the vehicle's configuration, and the first bolt reattached through the plate at a different hole in the vehicle frame.

21 Claims, 13 Drawing Sheets

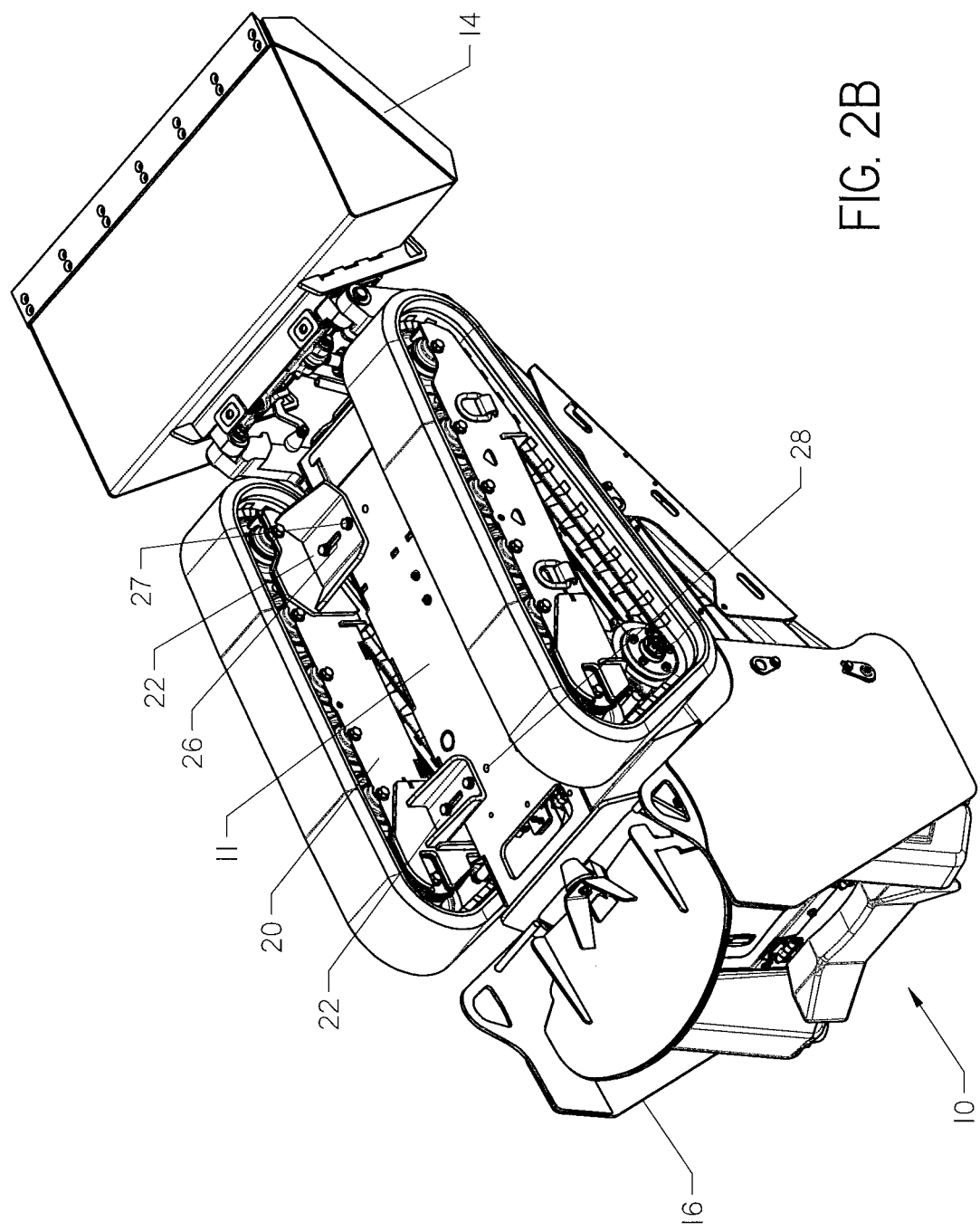

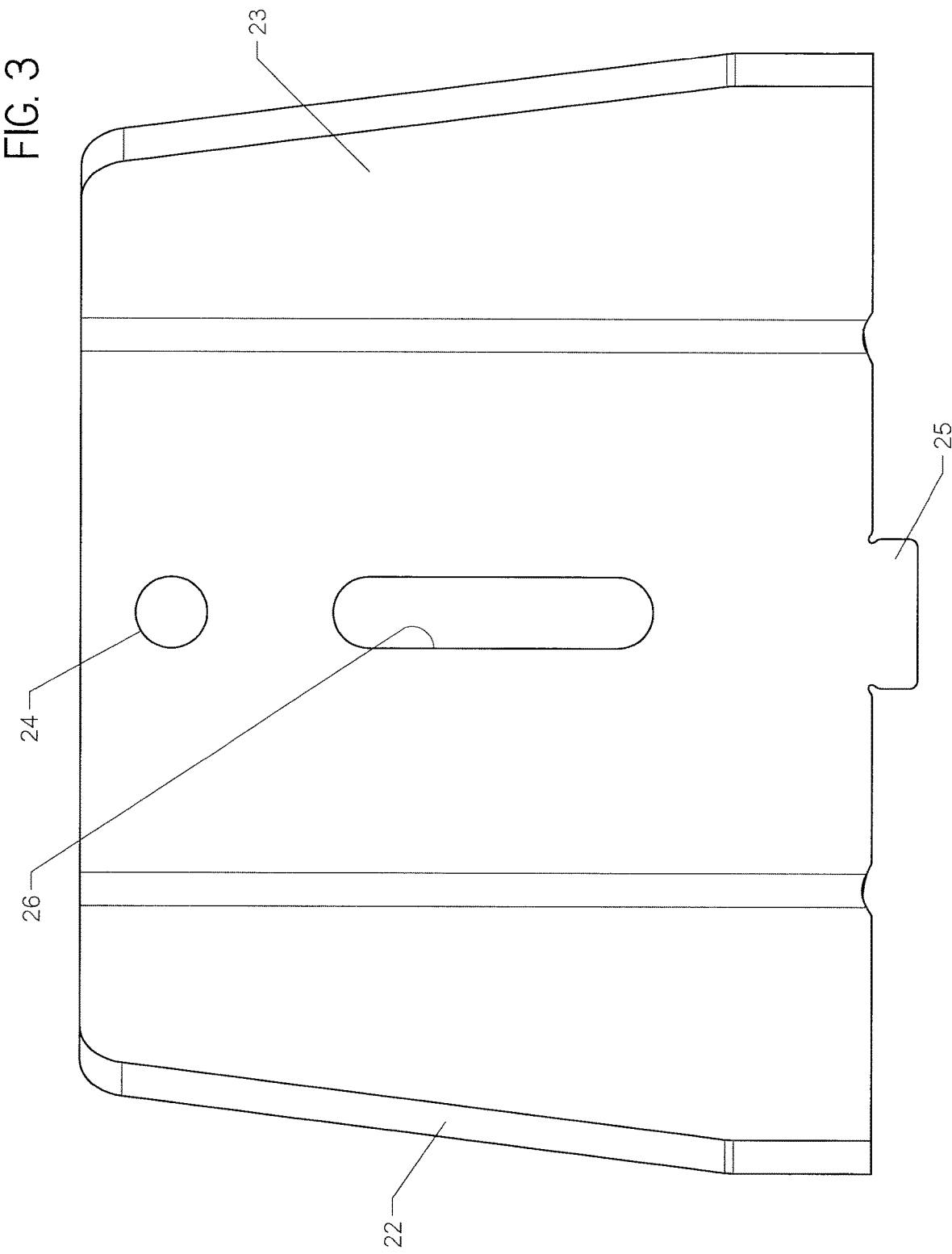

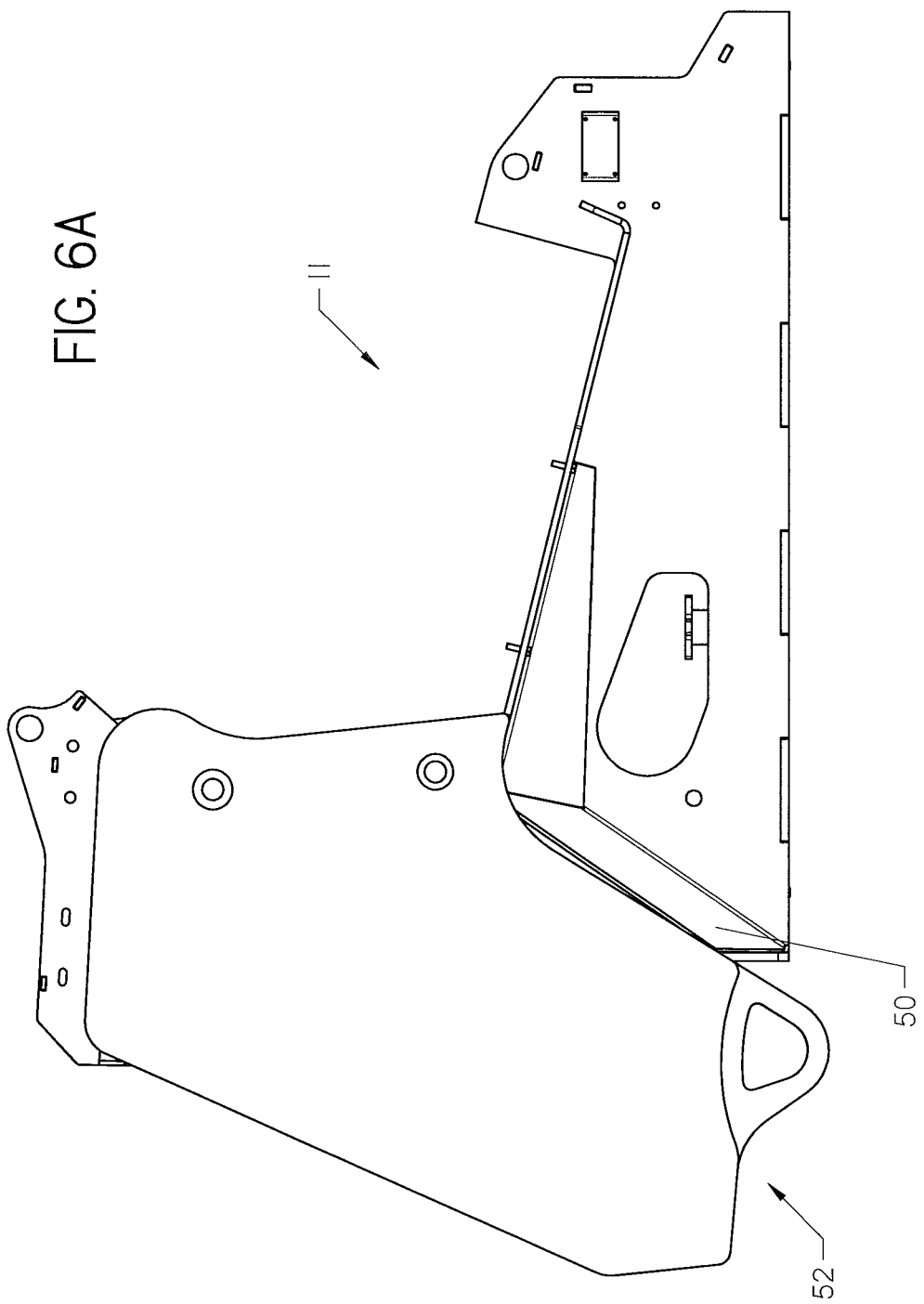

ADJUSTABLE TRACKS

SUMMARY

The present invention is directed to a vehicle having a vehicle frame and a first track assembly. The vehicle frame has a plurality of attachment points disposed on a ground-facing surface. The first track assembly comprises a track frame, a track disposed around the track frame, a first attachment plate, and a plurality of connectors. The first attachment plate extends from the track frame and has a slot and aperture. The plurality of connectors are configured to attach the first attachment plate to a selected number of the attachment points through a selected one of the slot and the aperture.

The vehicle has a first and a second orientation. The first orientation is characterized by the vehicle frame and track frame being separated by a first distance. The second orientation is characterized by the vehicle frame and track frame being separated by a second distance. The first distance is shorter than the second distance. The slot and aperture are each aligned with an attachment point in each of the first and second orientations.

In another aspect, the invention is directed to a method of adjusting the width of a work machine, the work machine comprising a track frame and a vehicle frame. The method's steps comprise loosening a first connector at a first connection point on the vehicle frame, where the first connector is disposed through a slot on the track frame. Additionally, the method includes removing a second connector from an aperture on the track frame and a second connection point on the vehicle frame, changing a lateral position of the track frame relative to the vehicle frame so that the aperture on the track frame and a third connection point form a continuous passage, and placing a selected one of the second connector and a substantially similar connector through the continuous passage. The method additionally comprises tightening the first connector at the first connection point.

In another aspect the invention is directed to a vehicle. The vehicle comprises a frame having opposed sides, two track assemblies attached to the frame at an opposed side, and at least one bolt. The frame has a plurality of downwardly-disposed attachment points. The track assemblies each comprise a first plate having at least one aperture. The at least one bolt is configured for being disposed through the at least one aperture in the plate and one of the plurality of downwardly-disposed attachment points in at least two configurations.

The first configuration is defined by the two track assembly being located by a position of the at least one bolt position relative to the plurality of attachment points and at least one aperture at a position close to the frame. The second configuration is defined by the two track assemblies being located further from the frame than the first configuration, due to the positioning of the at least one bolt through the at least one aperture and one or more of the plurality of attachment points.

BRIEF DESCRIPTION OF THE DRAWINGS

FIG. 2B is a back bottom left side perspective view, oriented more to the side and less underneath the vehicle than the perspective view of FIG. 2A.

FIG. 3 is a bottom view of a plate for attachment to the track assemblies of the vehicle.

FIG. 6A is a right side view of the structural frame.

DETAILED DESCRIPTION

Figure 1:
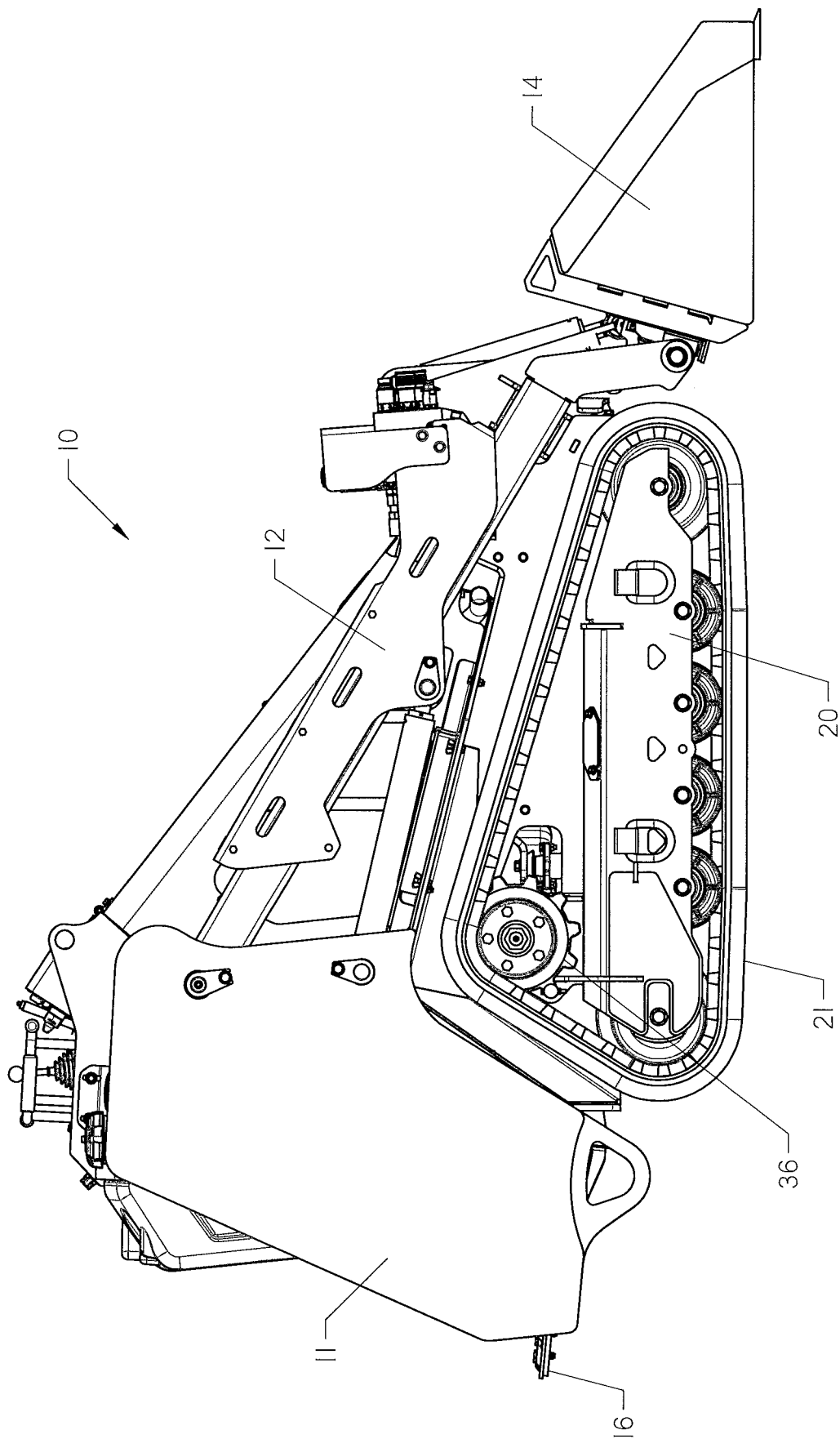
FIG. 1 is a side view of a compact, tracked utility vehicle.

Compact utility loaders, such as the vehicle 10 shown in FIG. 1, are designed to be useful tools on jobsites, including residential landscaping where gate restrictions and turf damage are considerations. The vehicles 10 comprise a frame 11 which supports loader arms 12. The loader arms 12 support a tool 14 for use at a job site. Shown is a common configuration, where the tool 14 is a bucket. An operator may stand behind the frame 11 on a platform 16. Alternatively, such vehicles may be "walk behind" and not use a platform.

The frame 11 is supported by two track assemblies 20. The track assemblies 20 may come in two configurations or orientations. The first configuration is one with "narrow" tracks. A "narrow" configuration should be understood to mean that the track assemblies 20 are located as close to the frame 11 as possible. "Narrow" configurations are useful for using the vehicle 10 in applications where gate clearances may be small. Often, gates may be 36" in width, requiring the overall width of the machine to be less than 36" in order to pass through the gate to a backyard or other area.

While "narrow" configurations are useful in increasing maneuverability of a vehicle 10, there are other limitations. Providing rubber tracks with less width increases the ground pressure exerted on the surface of the ground by the vehicle 10. This is critical for sensitive turf. Further, even if track width remains constant, a "wide" configuration improves the stability of the machine. In general, a "wide" configuration is preferred, so long as gate clearance is not an issue.

It would, therefore, be advantageous to use a track assembly which is configurable between the "narrow" and "wide" configurations. Such assemblies do exist, though they may be difficult to manage. For example, such an arrangement may require the dismounting of an engine, or the use of a structural attachment which may require specialized training to operate. Further, the use of wide tracks in a wide configuration may be impossible due to design constrains due to the shape of the frame—that is, the rubber tracks may contact the frame if wide tracks are used. Therefore, such assemblies often require changing the tracks themselves.

Figure 2A:
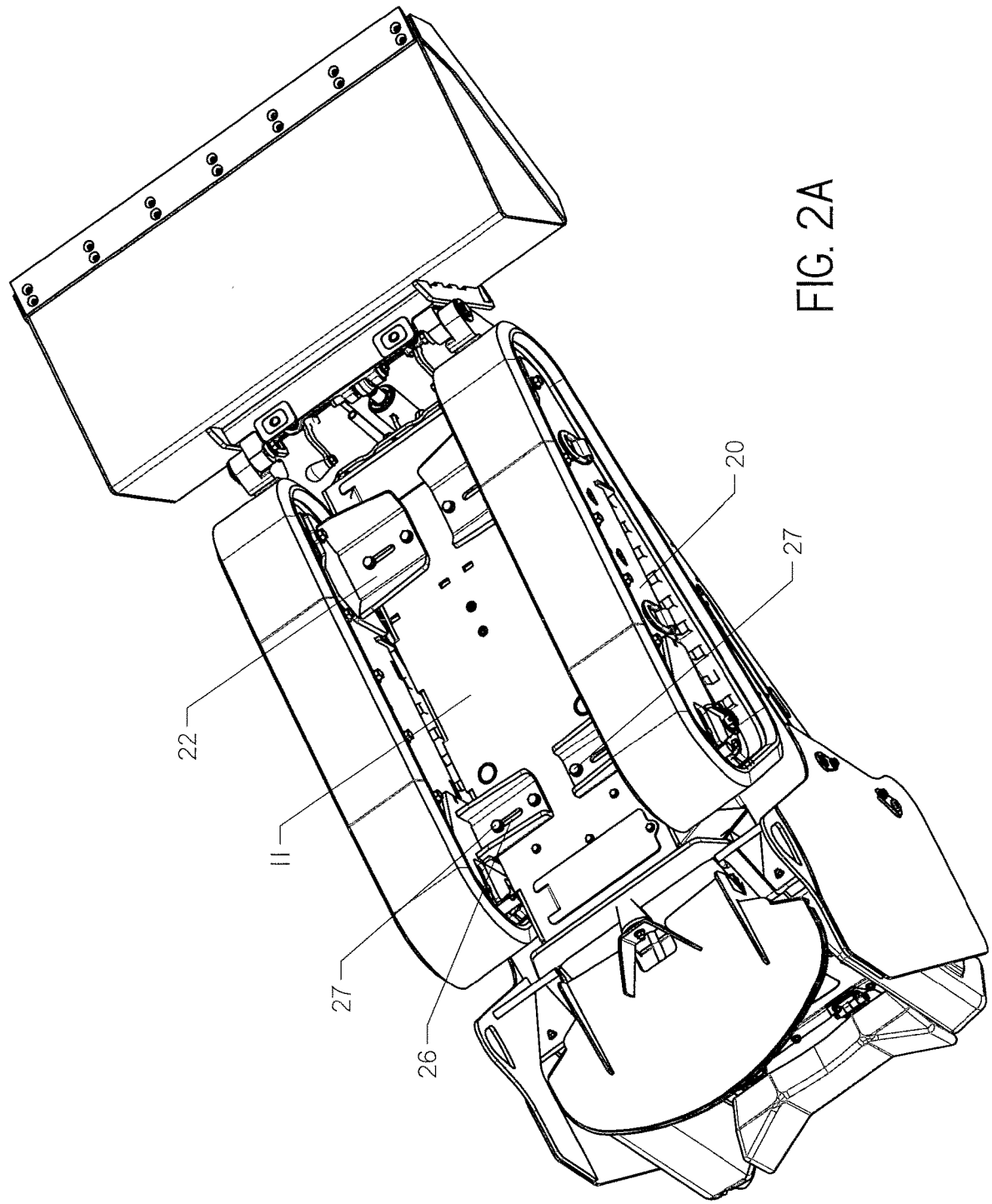
FIG. 2A is a back bottom left side perspective view thereof.

With reference to the Figures, a design is shown which overcomes these limitations. The vehicle 10, as best shown in FIGS. 2A-2B, has two track assemblies 20 which are connected to the frame 11 by plates 22. As shown, each track assembly 20 is connected through two plates 22.

The plates 22, separately shown in FIG. 3, each define a bolt hole 24 and a slot 26. The plates 22 may have a flanged portion 23 which adds material and rigidity while being designed not to contact the frame 11 when the plate connects the track assembly 20 and the frame. The plates 22 shown have a tab 25 for connection to the track assembly 20, though the plates 22 may be connected by welding or other means.

Figure 4:
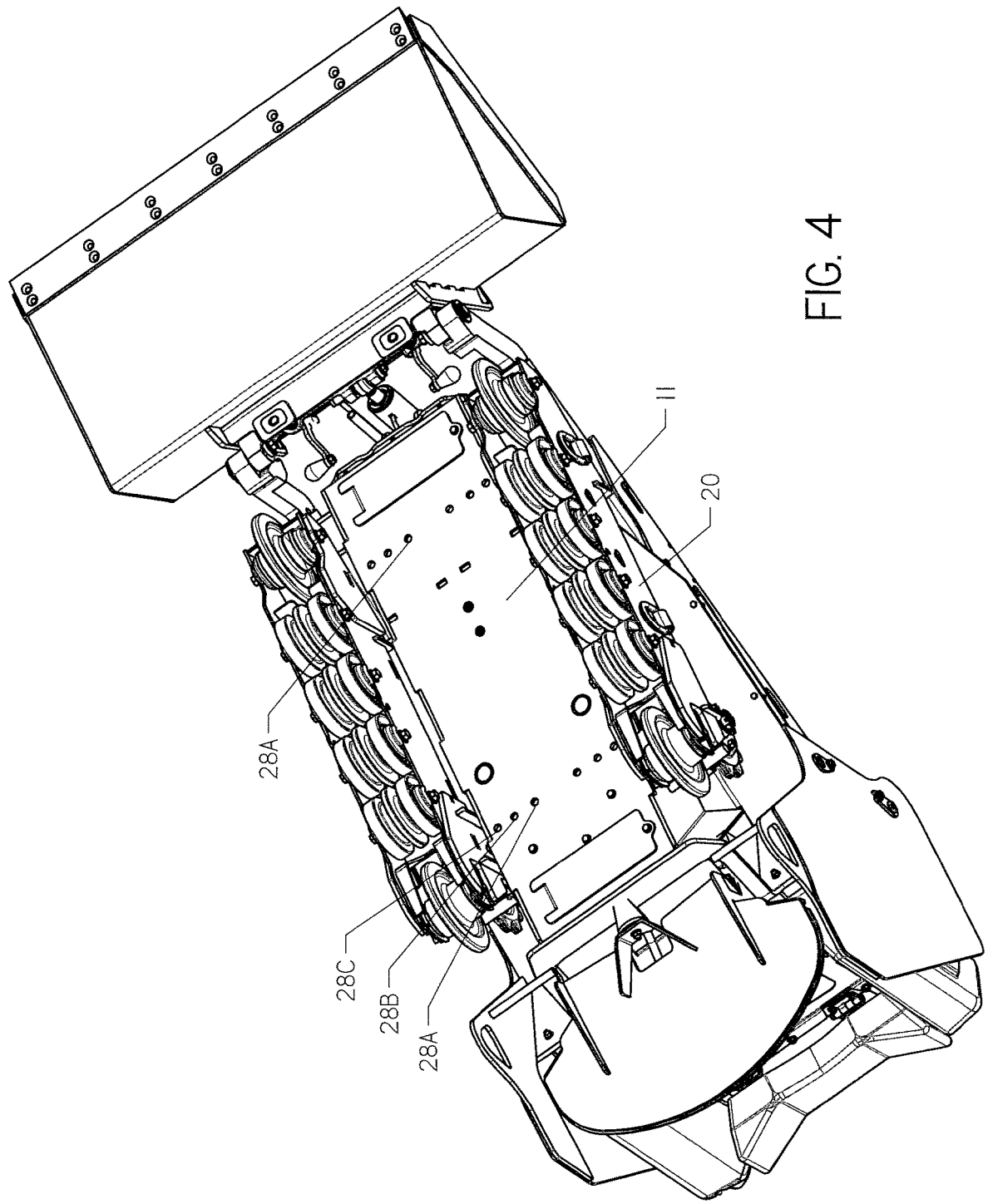
FIG. 4 is a bottom left view with the track and plate removed for better visual of the bottom of the vehicle frame.

With reference to FIGS. 2A-2D, the plates 22 are configured to engage with connectors such as bolts 27, which may be disposed through the plates 22 to engage with one or more holes 28 formed in the frame 11. In FIG. 4, the plates 22 are removed such that each hole 28 is visible. For reference, in the array of three holes corresponding to each plate 22, the innermost hole in each array is given reference number 28A, the intermediate hole given 28B, and the outermost hole given 28C. It should be understood that these holes are referred to as "downwardly-disposed" insofar as a tracked vehicle is configured for its tracks to engage the ground, which is typically "down" from a vehicle frame.

As shown in FIG. 2A, the track assemblies 20 are placed in a narrow configuration. In this configuration, each plate 22 is attached by two bolts 27. One of the two bolts 27 is disposed through the bolt hole 24 and the innermost hole 28A (FIG. 4). The other bolt 27 is disposed through the slot 26 and the outermost hole 28C. In FIG. 2B, the track assemblies are in a wide configuration. One of the two bolts 27 is disposed through the bolt hole 24 and the intermediate hole 28B (FIG. 4). The other bolt 27 is disposed through the slot 26 and the outermost hole 28C.

The track assemblies 20 are thus movable along the slot 26 formed in the plate to convert the vehicle 10 from a wide configuration to a narrow configuration and back. When changing configurations, the vehicle 10 is preferably lifted such that the track assemblies 20 are not receiving ground pressure. One bolt 27 is removed from the bolt hole 24. The other bolt 28 may be loosened, but not removed. This process is repeated at each plate 22 on each track assembly 20. When complete for all four plates, each track assembly 20 can be moved relative to the frame 11 along the length of the slot 26.

Figure 2C:
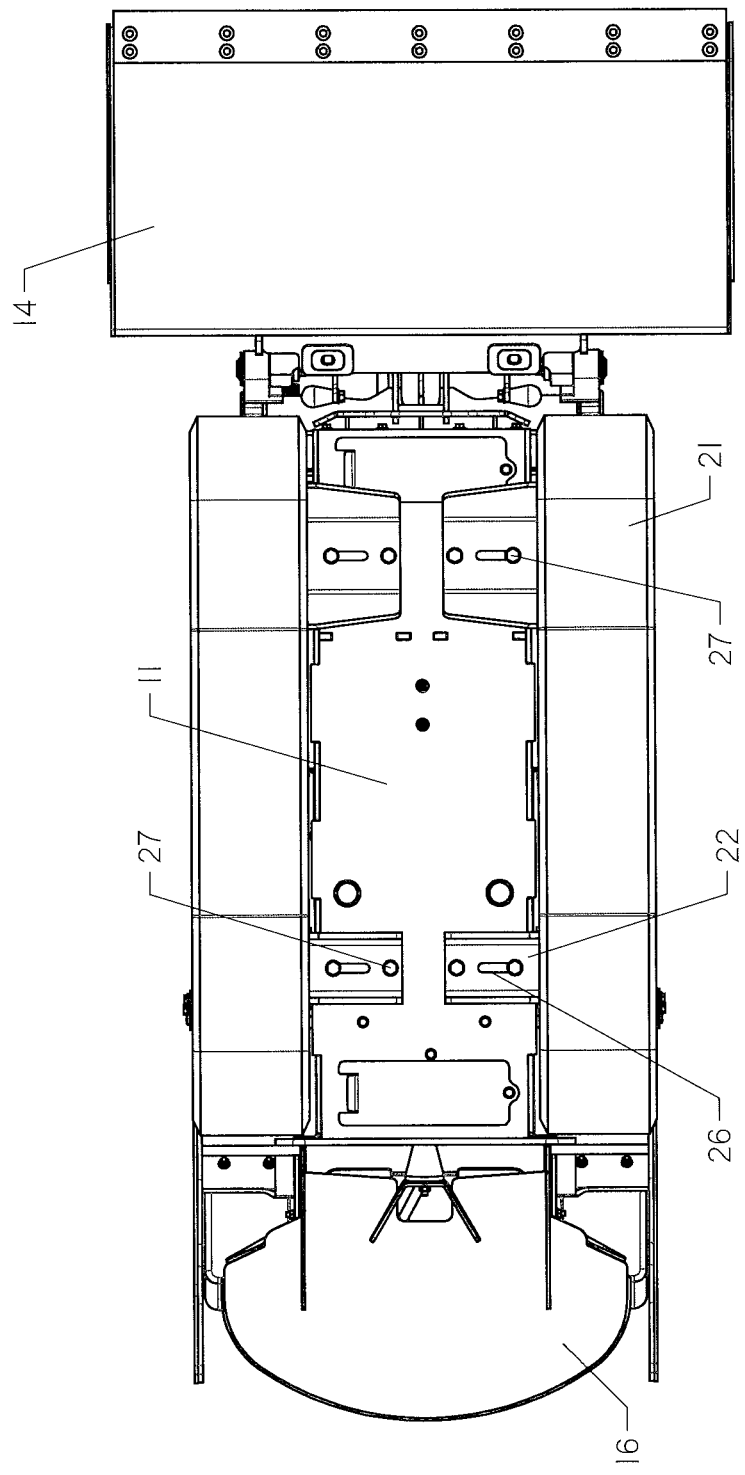
FIG. 2C is a bottom view showing the track frames in the narrow configuration.
Figure 2D:
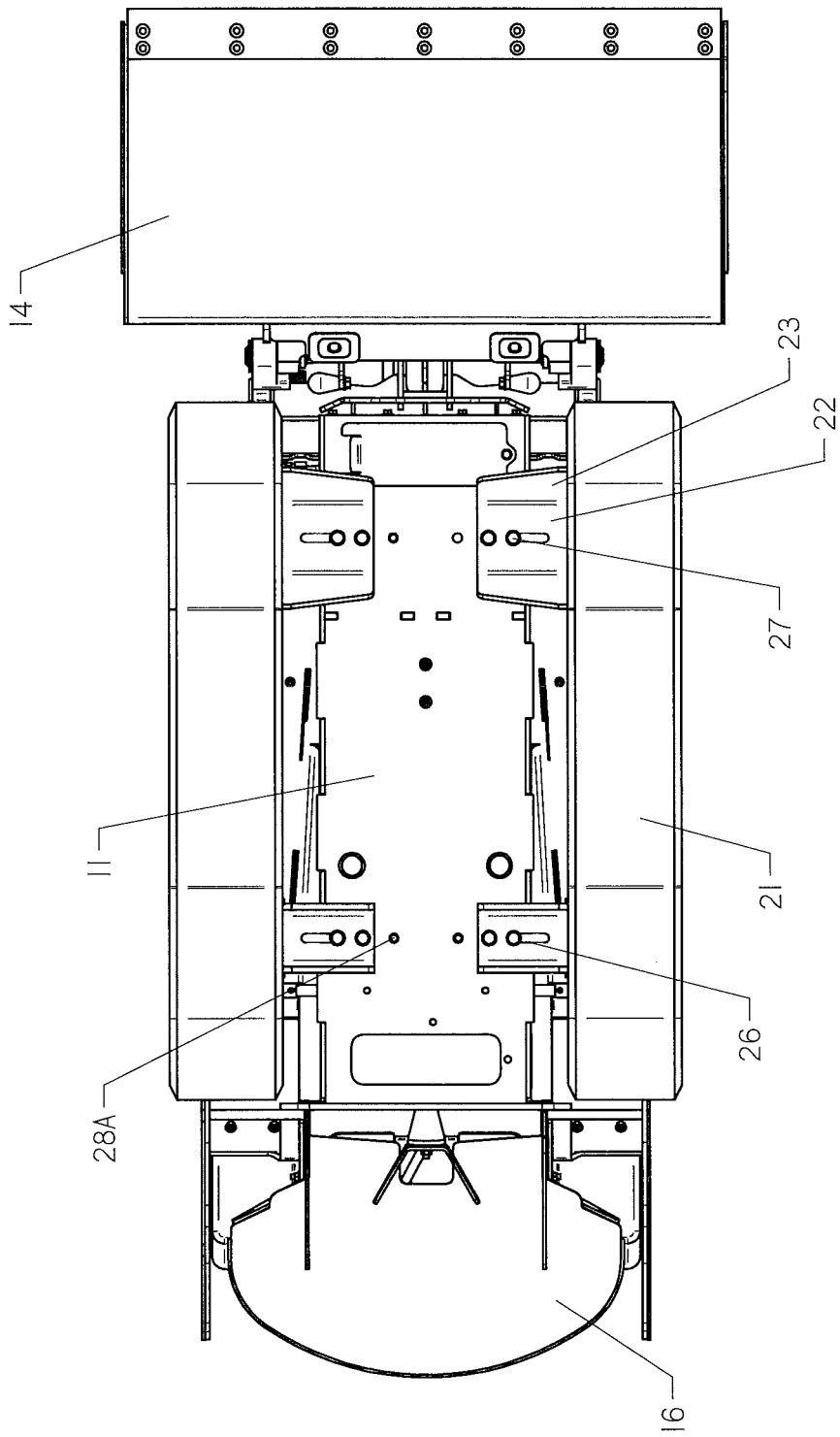
FIG. 2D is a bottom view showing the track frames in the wide configuration.

The track assemblies 20 may then be positioned such that the bolt hole 24 of each plate 22 is over the preferred one of the innermost holes 28A for a narrow configuration and intermediate hole 28B for a wide configuration. Bolts 27 are then inserted through the bolt hole 24 and the bolt within the slot 26 is tightened. FIG. 2C shows the machine 10 in narrow configuration, while FIG. 2D shows the machine 10 in a wide configuration.

While the figures show the bolt hole 24 inwardly disposed relative to the slot 26, the alternative arrangement is also possible without departing from the scope of the invention. For example, if the bolt hole 24 is outwardly disposed, the innermost hole 28A may be utilized with the static bolt 27, while the bolt hole 24 is moved from the intermediate hole 28B to the outermost hole 28C to move the machine 10 from the narrow configuration to the wide configuration.

Other configurations may also be used for the plate 22, such as a single slot, or dual slots, each with one or more bolts which are used to adjust the position of the track assemblies relative to the frame 11. In addition, the plate 22 may instead be more than one structure, with slots, bolt holes or the like in known arrangement to match connection points on the frame.

Further, while each track assembly 20 is attached at two plates 22, a single plate may be utilized with more than one bolt hole 24 and slot 26 disposed therein. For example, the general configuration shown in the figures may be utilized, but with a continuous plate extending the length of the vehicle frame 11.

In operation, the vehicle 10 may be converted from a first, narrow configuration to a second, wide configuration. Such a transition would preferably be performed with the vehicle 10 on a lift or other structure to remove the weight of the vehicle from the interaction between the vehicle frame 11 and the plates 22.

With the vehicle 10 in a first configuration, the one of the two bolts 27 disposed through the slot 26 and outermost hole 28C is loosened. Then the other of the two bolts 27 which is within the innermost hole 28A and bolt hole 24 is removed. In embodiments where more than one slot-and-hole combination exists on a track assembly 20, both or all of the connections should be adjusted at once.

With the bolts 27 ready for the transition from the narrow configuration to the wide configuration, the track assembly 20 is moved laterally away from the vehicle frame 11. The longitudinal position of the track assembly 20 is maintained by the remaining, but loosened bolt 27 disposed through the slot 26 and outermost hole 28C, though the position of the bolt 27 within the slot changes as the track assembly 20 is moved.

Once the bolt hole 24 of the plate 22 overlies the intermediate hole 28B such that they form a continuous passage, a bolt 27 is inserted therein. All bolts 27 are then tightened. The vehicle 10 is now in a wide configuration with respect to the subject track assembly 20. As the vehicle likely comprises two such track assemblies 20, the process is repeated for the other track assembly 20. Optionally, the track surrounding the track assembly 20 may be removed and replaced with a track of a different width using known track tensioning systems. One such system is disclosed in U.S. Pat. No. 10,435,092, issued to Stellman, the contents of which are incorporated by reference herein.

It should be understood that while the bolt 27 originally within the innermost hole 28A may be reused, replacement of this bolt 27 with a substantially similar bolt may be advantageous if wear or damage is noted. For the purposes of this specification, a "substantially similar" bolt or connector shall mean one which fits within the relevant holes 28A-C and is configured to connect to the plate 22.

Figure 5:
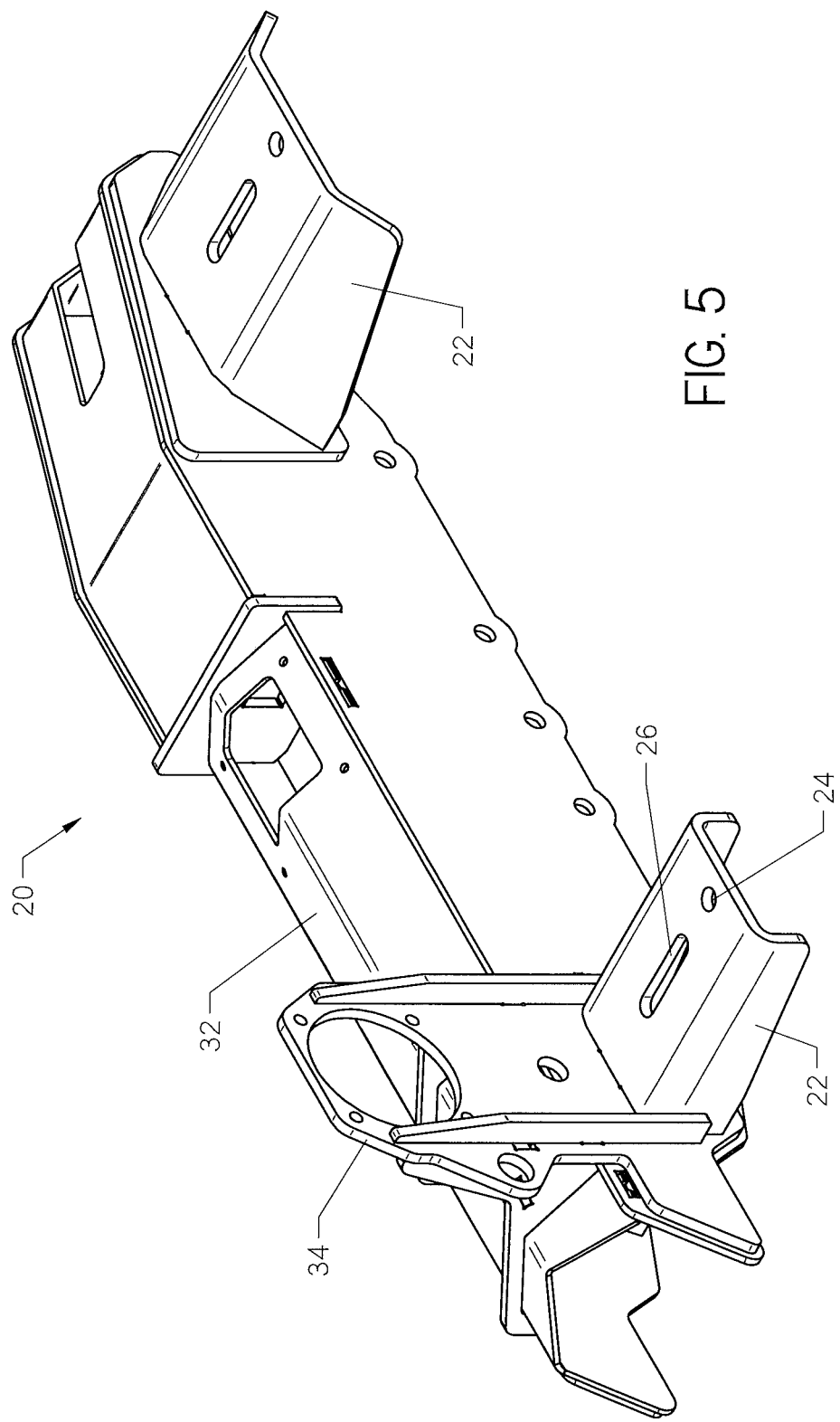
FIG. 5 is a view of the track frame, with drive motors, sprockets, bogie rollers and tracks removed.
Figure 6B:
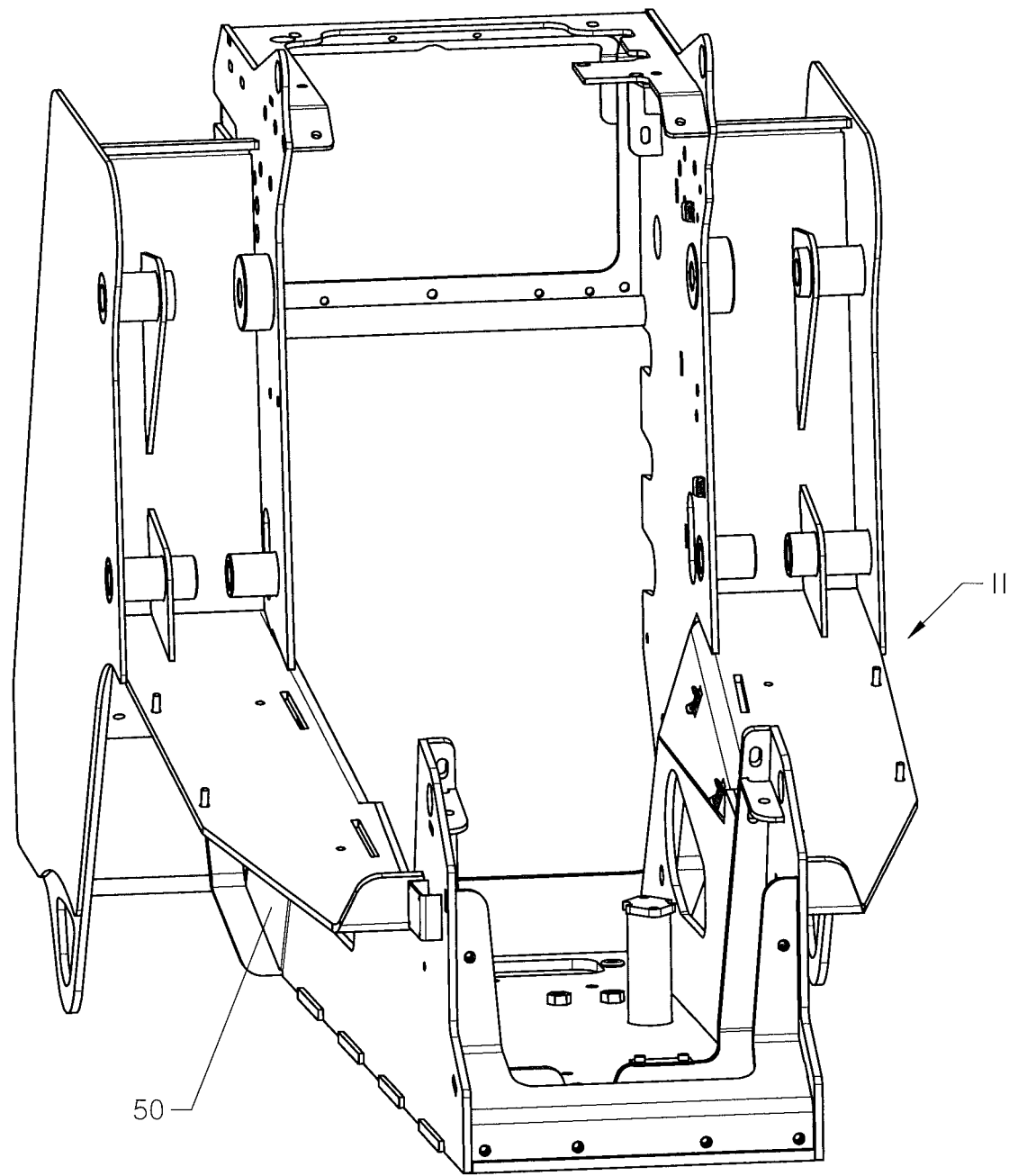
FIG. 6B is a front right view thereof.
Figure 6C:
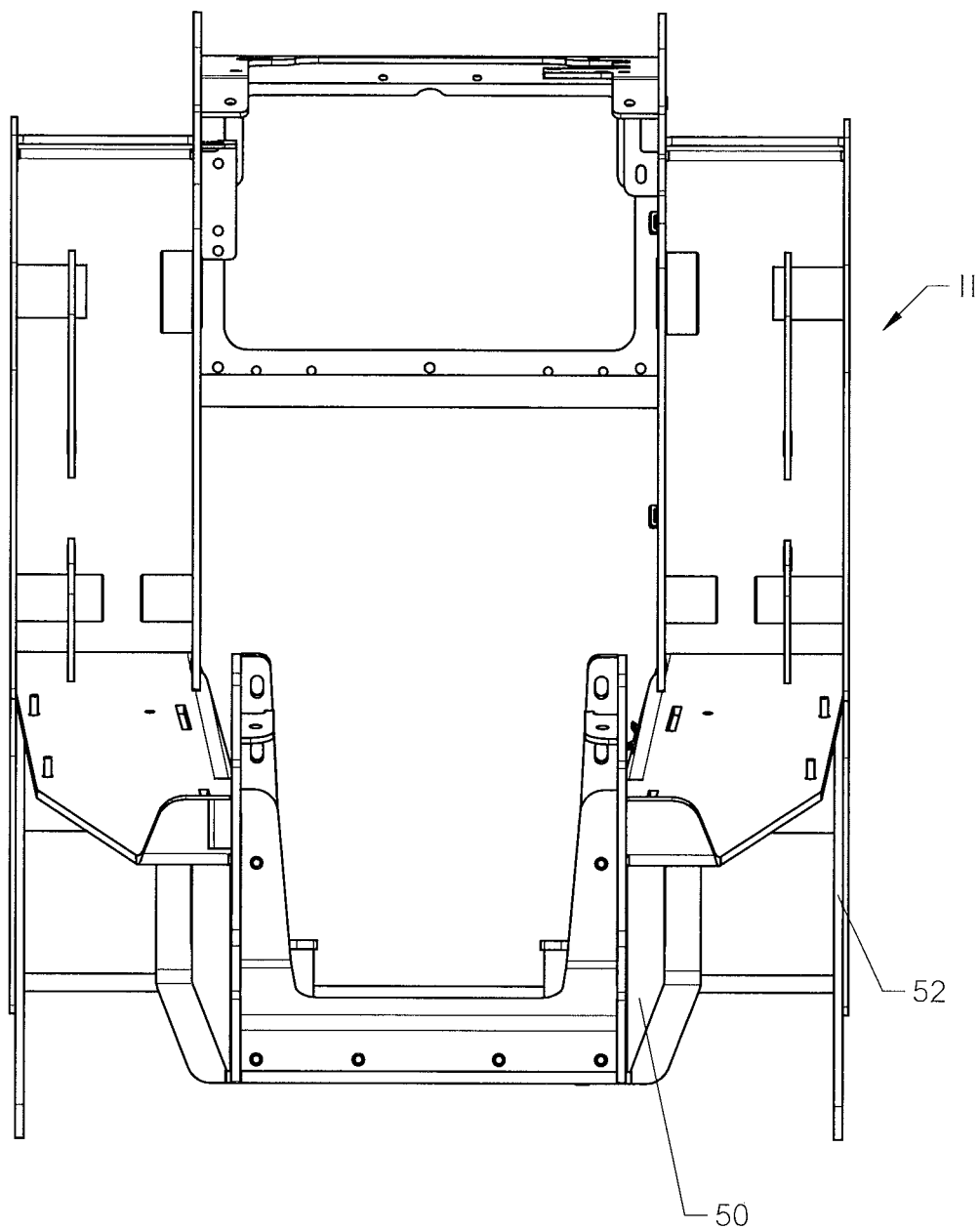
FIG. 6C is a rear view thereof.
Figure 6D:
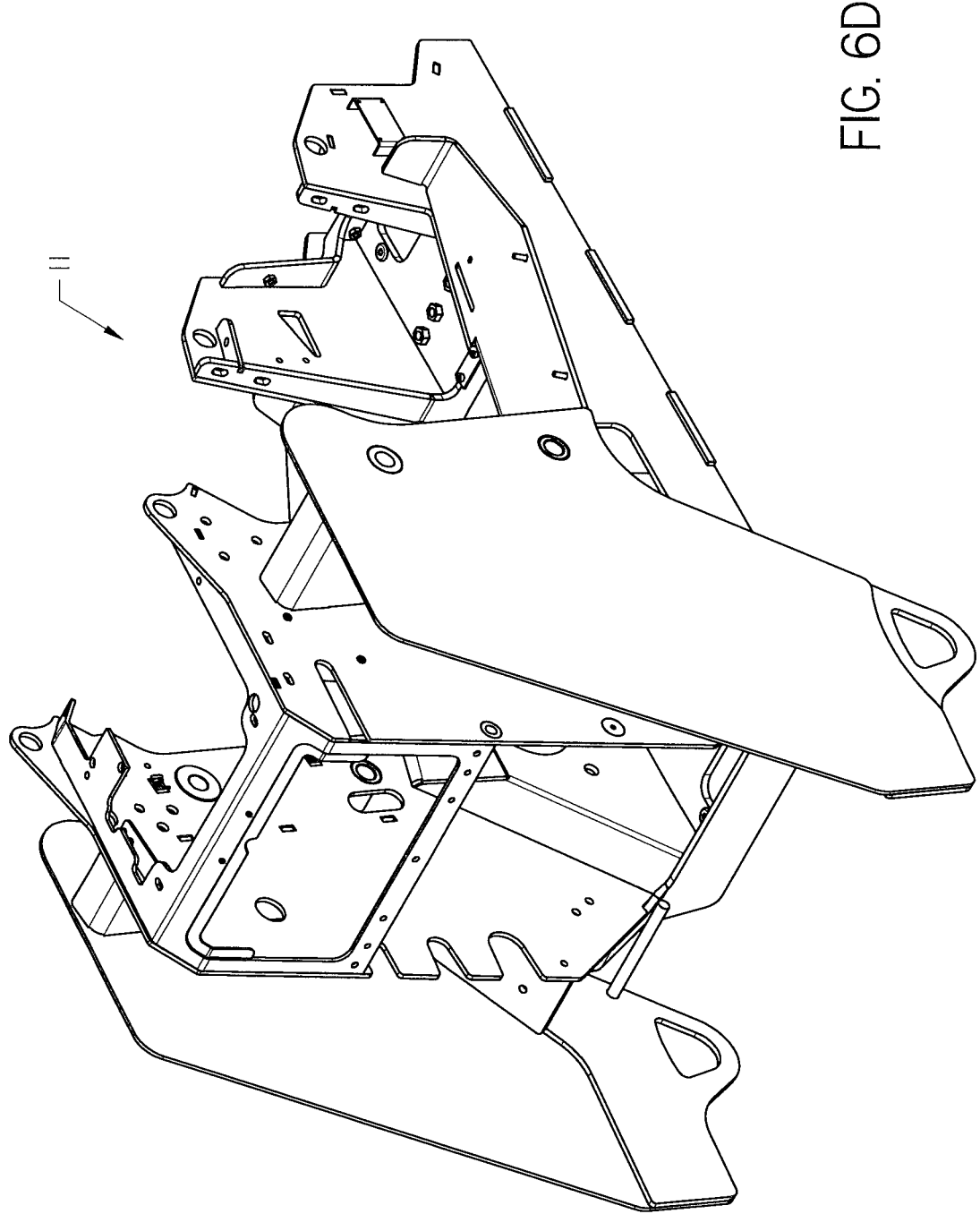
FIG. 6D is a right top rear view thereof.

With reference to FIG. 5, one track assembly 20 is shown. Two plates 22 are attached by welding, tab 25, or other connection means to a substructure 32. The substructure 32 supports rollers and drive sprockets (not shown) for translating a rubberized track. A motor mount 34 extends from the substructure 32 and moves therewith. The motor mount 34 provides a mounting location for a motor, which drives a sprocket 36 for providing motive force to the track 21. By placing track motors on each track assembly 20, there is no need for adjusting an axle or mechanical connection between a motor on the frame and the sprocket 36 when the configuration of the vehicle 10 is adjusted.

It should be appreciated that hydraulic tubing or the like is necessary for providing power to the motor of each track assembly 20. Preferably, hard tubing 70 may be utilized on the track assembly 20, except where necessary to allow the configuration of the track assemblies to be changed as described above.

Figure 7:
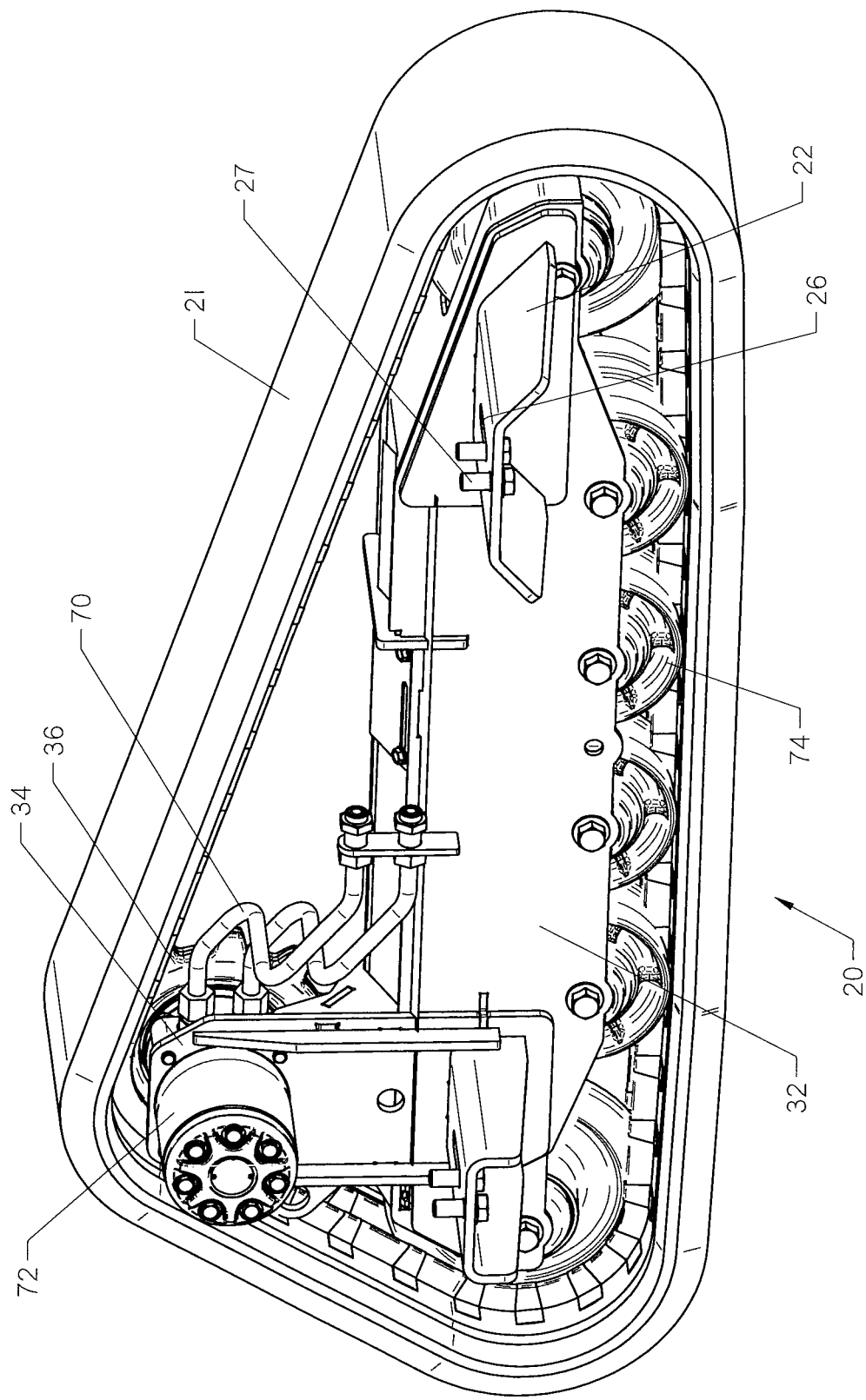
FIG. 7 is a front right view of a detached track assembly, with bolts disposed through the plates and hard tubing attached to a hydraulic cylinder.

With reference to FIG. 7, a hydraulic motor 72 is shown attached to the motor mount 34 of the track assembly 20. Hard tubing 70 is attached to the motor mount 34 and provides hydraulic fluid to the motor 72. A flexible hydraulic line (not shown) connects the hard tubing 70 to the prime mover (not shown), mounted on the frame 11. Just enough slack is provided in the flexible hydraulic line to allow the range of motion needed, but no more. As a result, the risk of stretching or tearing a flexible hydraulic line is reduced.

In FIG. 7, the bolts 27 are shown disposed through plates 22. The sprocket 36 is driven by the hydraulic motor 72, which in turn provides motive force to the track 21. Bogie rollers 74 are mounted to the track substructure 32 to provide shape and structural support to the track 21 as it moves along a surface of the ground.

With reference to FIGS. 6A-6D, the frame 11 is shown in more detail. This frame 11 has a lower rear region 5o. The lower rear region 50 tapers towards the back end 52 of the frame 11. The tapered lower rear region 50 allows clearance such that the track assembly 20 may appropriately be located near the frame 11 without contacting it, whether in the wide or narrow configuration.

While a hydraulic motor 72 is contemplated herein, other motors, such as electric drive motors, may be used to operate the tracks. Power conduits for such an electric drive motor may also be arranged to reduce the amount of flexible wiring utilized, as with the hydraulic line discussed above.

Changes may be made in the construction, operation and arrangement of the various parts, elements, steps and procedures described herein without departing from the spirit and scope of the invention as described in the following claims. Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise.

Phrases in the claims such as "configured to" are not intended to invoke the provisions of 35 U.S.C. § 112(f). When § 112 (f) is invoked herein, it will be due to the explicit use of the words "means for" or "step for".

The invention claimed is:

1. A vehicle comprising:
   a vehicle frame having a plurality of attachment points disposed on a ground-facing surface;
   a first track assembly comprising:
      a track frame;
      a track disposed about the track frame; and
      a first attachment plate extending from the track frame, the first attachment plate having a slot and an aperture; and
      a plurality of connectors, each of the plurality of connectors configured to attach the first attachment plate to a one of the plurality of the attachment points through a selected one of the slot and the aperture;
   wherein the vehicle has a first orientation and a second orientation, in which:
      the first orientation is characterized by the vehicle frame and track frame being separated by a first distance; and
      the second orientation is characterized by the vehicle frame and track frame being separated by a second distance, wherein the first distance is shorter than the second distance;
   wherein the slot and aperture are each aligned with an attachment point in each of the first and second orientations.

2. The vehicle of claim 1 comprising:
   a second attachment plate extending from the track frame, the second attachment plate having a slot and an aperture.

3. The vehicle of claim 2 in which the plurality of attachment points include:
   a first attachment point, second attachment point, and third attachment point at a first region of the vehicle frame, wherein the second attachment point is disposed between the first attachment point and the third attachment point; and
   a fourth attachment point, fifth attachment point, and sixth attachment point at a second region of the vehicle frame, wherein the fifth attachment point is disposed between the fourth attachment point and the sixth attachment point.

4. The vehicle of claim 3 in which:
   the vehicle is in the first orientation; and
   a first of the plurality of connectors is disposed through the slot of the first attachment plate into the first attachment point;
   a second of the plurality of connectors is disposed through the aperture of the first attachment plate into the third attachment point;
   a third of the plurality of connectors is disposed through the slot of the second attachment plate into the fourth attachment point; and
   a fourth of the plurality of connectors is disposed through the aperture of the second attachment plate into the sixth attachment point.

5. The vehicle of claim 3 in which:
   the vehicle is in the second orientation; and
   a first of the plurality of connectors is disposed through the slot of the first attachment plate into the first attachment point;
   a second of the plurality of connectors is disposed through the aperture of the first attachment plate into the second attachment point;
   a third of the plurality of connectors is disposed through the slot of the second attachment plate into the fourth attachment point; and
   a fourth of the plurality of connectors is disposed through the aperture of the second attachment plate into the fifth attachment point.

6. The vehicle of claim 1 further comprising:
   a second track frame attached to the vehicle frame.

7. The vehicle of claim 1 in which the plurality of attachment points include a first attachment point, second attachment point, and third attachment point, wherein the first attachment point, second attachment point, and third attachment point are disposed along a first line, such that:
   in the first orientation and the second orientation, a first of the plurality of connectors is disposed through the slot of the first attachment plate into the first attachment point;
   in the first orientation, a second of the plurality of connectors is disposed through the aperture of the first attachment plate into the third attachment point; and
   in the second orientation, the second of the plurality of connectors is disposed through the aperture of the first attachment plate into the second attachment point.

8. The vehicle of claim 1 in which the aperture of the first attachment plate is a circular hole.

9. A method of configuring the vehicle of claim 7, comprising:
   placing the first of the plurality of connectors through the slot and into the first attachment point;
   thereafter, moving the first track assembly relative to the vehicle frame such that the aperture of the first attachment plate and a selected one of the second attachment point and the third attachment point forms a continuous passage;
   placing the second of the plurality of connectors through the aperture and into the selected one of the second attachment point and the third attachment point;

tightening the first of the plurality of connectors within the first attachment point; and tightening the second of the plurality of connectors within the selected one of the second attachment point and the third attachment point.

10. The vehicle of claim 1 comprising:
a motor disposed on the track frame and configured to move the track about the track frame;
a hydraulic supply disposed on the vehicle frame; and
a hydraulic conduit disposed between the motor and the hydraulic supply, comprising:
a hard tubing segment movable with the first track assembly; and
a flexible tubing segment disposed between the vehicle frame and the hard tubing segment.

11. A method of adjusting the width of a work machine comprising a track frame and a vehicle frame, the method comprising:
loosening a first connector at a first connection point on the vehicle frame, wherein the first connector is disposed through a slot on the track frame;
removing a second connector from an aperture on the track frame and a second connection point on the vehicle frame;
changing a lateral position of the track frame relative to the vehicle frame such that the aperture on the track frame and a third connection point form a continuous passage;
placing a selected one of the second connector and a substantially similar connector through the continuous passage; and
tightening the first connector at the first connection point.

12. The method of claim 11 in which the second connection point is disposed between the first connection point and the third connection point.

13. The method of claim 11 in which the third connection point is disposed between the first connection point and the second connection point.

14. The method of claim 11 in which the slot is characterized as a first slot and the aperture is characterized as a first aperture, and further comprising:
prior to the step of changing the lateral position of the track frame:
loosening a third connector at a fourth connection point on the vehicle frame, wherein the third connector is disposed through a second slot on the track frame; and
removing a fourth connector from a second aperture on the track frame and a fifth connection point on the vehicle frame;
after the step of changing the lateral position of the track frame:
placing a selected one of the fourth connector and a substantially similar connector through the second aperture and a sixth connection point; and
tightening the first connector at the first connection point.

15. The vehicle of claim 11 in which the track frame is characterized as a first track frame and further comprising:
loosening a third connector at a fourth connection point on the vehicle frame, wherein the fourth connector is disposed through a slot on the second track frame;
removing a fourth connector from an aperture on the second track frame and a fifth connection point on the vehicle frame;
changing a lateral position of the second track frame relative to the vehicle frame such that the aperture on the second track frame and a sixth connection point are continuous;
placing a selected one of the fourth connector and a substantially similar connector through the aperture on the second track frame and the sixth connection point; and
tightening the third connector at the fourth connection point.

16. The method of claim 11 in which the first connection point is outwardly disposed relative to the second connection point and the third connection point.

17. The method of claim 11 in which the step of changing the lateral position of the track frame relative to the vehicle frame comprises moving the track frame away from the vehicle frame.

18. The method of claim 17, further comprising:
removing a first track from the track frame; and
placing a second track about the track frame;
wherein the second track has a greater width than the first track.

19. A vehicle comprising:
a frame having a plurality of downwardly-disposed attachment points and defining opposed sides;
two track assemblies, each track assembly attached to the frame at one of the opposed sides, each track assembly comprising:
a first plate having at least one aperture disposed therethrough; and
at least one bolt;
wherein the at least one bolt is configured for being disposed through the at least one aperture in the plate and one of the plurality of downwardly-disposed attachment points in at least two configurations;
wherein:
the first configuration is defined by the two track assembly being located by a position of the at least one bolt position relative to the plurality of attachment points and at least one aperture at a position close to the frame; and
the second configuration is defined by the two track assemblies being located further from the frame than the first configuration, due to the positioning of the at least one bolt through the at least one aperture and one or more of the plurality of attachment points.

20. The vehicle of claim 19 in which:
each of the two track assemblies further comprises:
a motor; and
a hard conduit configured to supply the motor with power;
and further comprising:
a flexible conduit extending from the hard conduit of one of the two track assemblies and the vehicle frame.

21. The vehicle of claim 20 in which the hard conduit comprises hard tubing configured as a pathway for hydraulic fluid.

* * * * *

UNITED STATES PATENT AND TRADEMARK OFFICE
CERTIFICATE OF CORRECTION

PATENT NO. : 12,460,377 B2
APPLICATION NO. : 18/159005
DATED : January 24, 2023
INVENTOR(S) : Jones et al.

Page 1 of 1

It is certified that error appears in the above-identified patent and that said Letters Patent is hereby corrected as shown below:

In the Specification

Column 5, Line 8, please delete "5o" and substitute therefor "50".

Signed and Sealed this
Second Day of December, 2025

John A. Squires
*Director of the United States Patent and Trademark Office*